United States Patent Office 2,986,613
Patented May 30, 1961

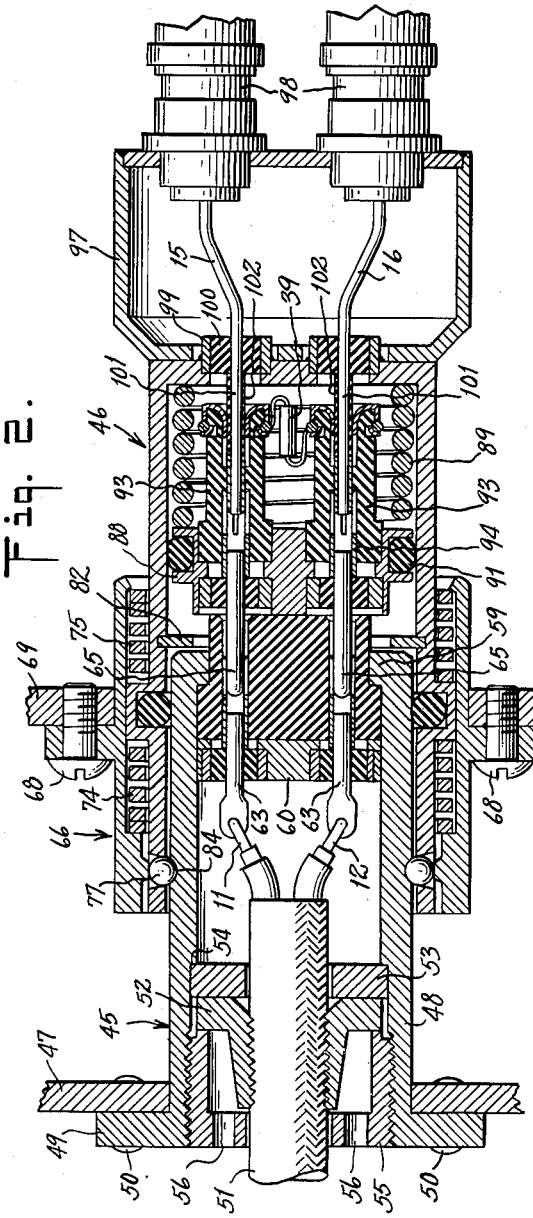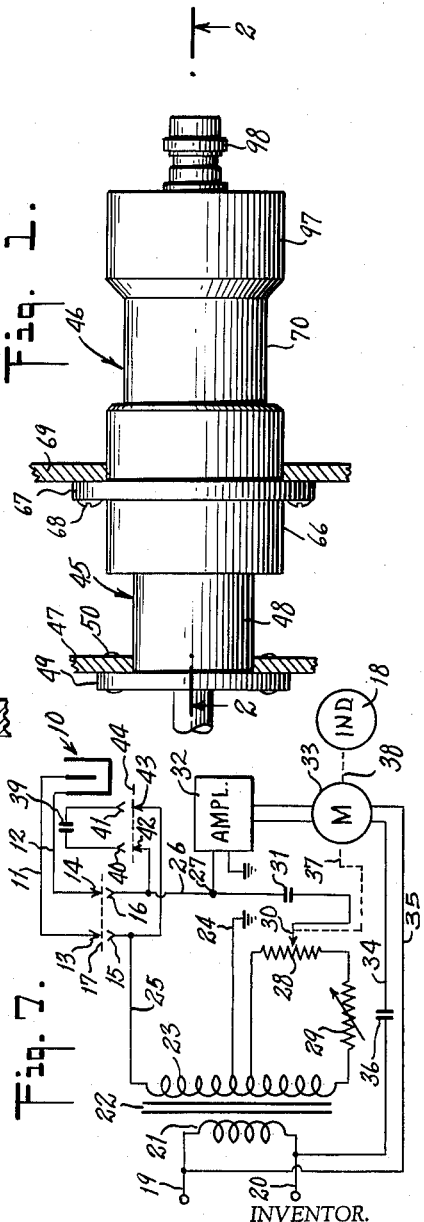

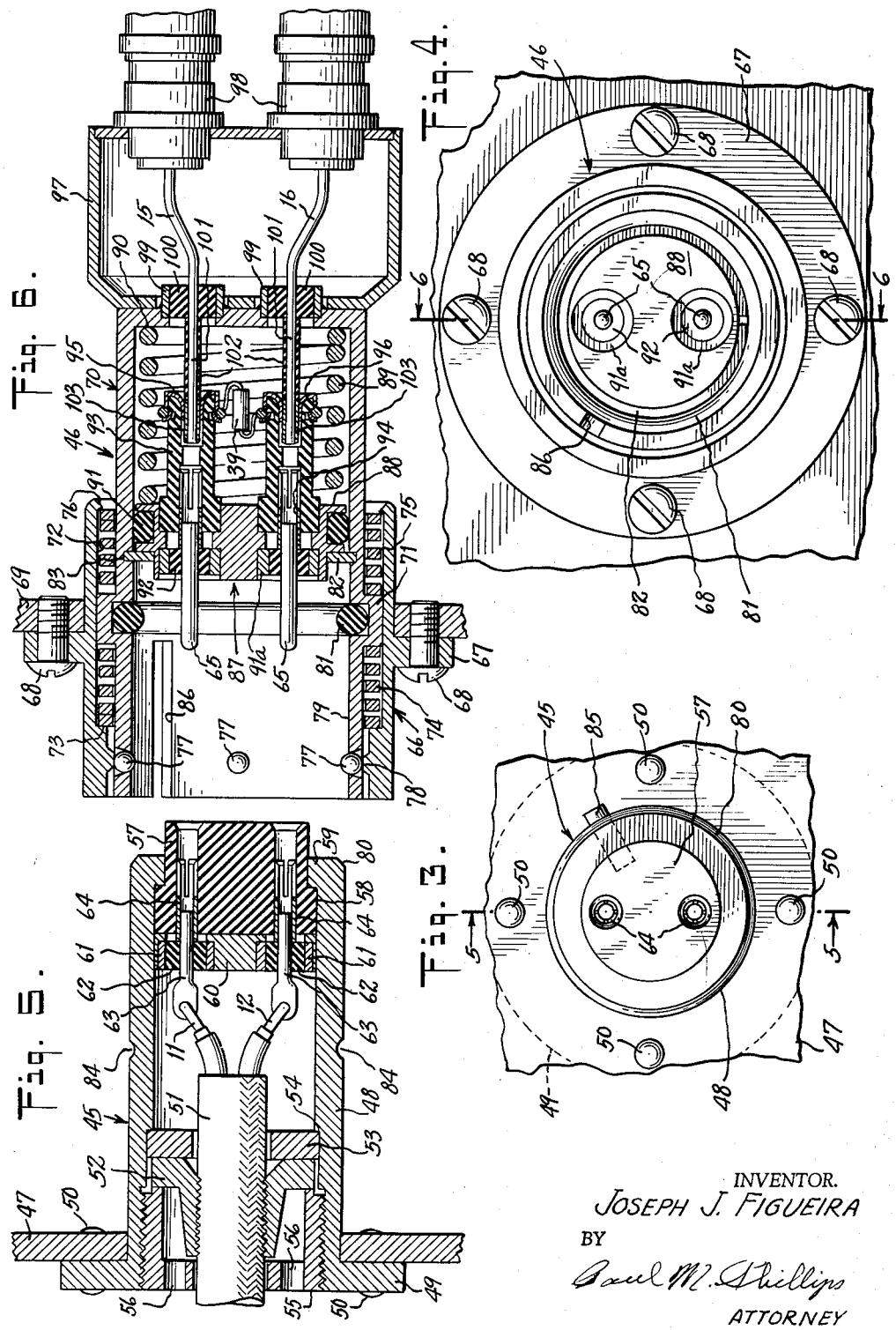

2,986,613

LIQUID FUEL MEASURING SYSTEM FOR AIRCRAFT DROP TANKS AND ELECTRICAL CONNECTOR USABLE THEREWITH

Joseph J. Figueira, Westbury, N.Y., assignor to The Liquidometer Corporation, Long Island City, N.Y., a corporation of Delaware Filed Mar. 11, 1958, Ser. No. 720,675

5 Claims. (Cl. 200—51.09)

The present invention relates to a liquid fuel measuring system for aircraft drop tanks and an electrical connector usable therewith. More particularly, the invention relates to a system for measuring and indicating the quantity of fuel in an aircraft tank, wherein provision is made for dropping the tank from the aircraft at the discretion of the pilot, for example, after the fuel supply thereof has been exhausted. It is now quite usual, particularly in connection with military aircraft intended for flying long distances from a base to a point where their mission is to be carried out, to provide one or more extra tanks of fuel, which can be dropped at the discretion of the operating personnel, either when empty or otherwise. Once these tanks have been dropped, the aircraft is considerably lightened in its normal weight and thus it is, to a certain extent at least, more maneuverable and requires less fuel for a given time or flight than when operating with a heavier load.

With conventional indication systems developed heretofore it is usual that some impedance means be carried with each of the fuel tanks and be responsive to the amount of fuel in the respective tanks as to the impedance value of such impedance means. If such a tank then is dropped, the impedance means which is carried by the tank remains with the tank and is thus abruptly disconnected from the circuit or electrical system or network in which the impedance means is normally connected for measuring and indication purposes. If no means were provided in the associated measuring and indication system, corresponding in character to the measuring means, for example, a pointer operating in connection with a dial, would in many instances at least and with many known systems be moved not only to and beyond one normal limit of its ordinary range of movement, but might even tend to move continuously in that same direction, resulting possibly in damage to the indicating instrument.

From another point of view, there are many systems using capacitors in each fuel tank, for example, in which the capacitors are connected in parallel and a single electrical system or network is connected to be responsive to the total capacitance of all the capacitors in all the tanks as so connected and is arranged to indicate the total amount of fuel in all the tanks. As will be seen, the sudden disconnecting of one of these capacitors would render such a system inaccurate to indicate the total fuel in the remaining tanks.

For all these reasons it has been suggested, for use in capacitance gauging systems, that a capacitance be supplied to be connected into the electrical system remaining after the dropping of the tank in the place of the capacitor contained in the dropped tank. In the past such a connection has been effected by a relay system energized upon the dropping of a particular tank and serving, from a broad point of view, to connect into the system a fixed impedance (capacitor) similar in character to the impedance (capacitor) separated from the system by the dropping of the tank. This fixed impedance is not limited to a capacitor as other types of impedances have been used for measuring the amount of fuel in the tank, the important feature being that the fixed impedance substituted upon the dropping of the tank shall be of the same character as the impedance member or element contained in and dropped with the tank. In a system in which the total amount of fuel in a plurality of tanks is being measured in accordance with known prior art systems, it is important in order that the indication be accurate after the dropping of the tank, that the impedance substituted in the place of the tank impedance which was dropped shall not only be of the same character as the tank impedance, i.e. a capacitor for a capacitor, etc.; but also it is preferably that the impedance value of the sub-substituted impedance shall be equal the impedance value which the tank impedance would have if the tank were still carried by the aircraft, but empty of fuel.

The present invention provides a novel device effective mechanically upon the physical act of dropping the tank and the concommitant separation of the electrical connections to the impedance in the tank for electrically connecting the substitute impedance into the circuit in the place of the dropped impedance.

Specifically, the present invention comprises an electrical connector having one or more suitable circuits or electric current flow paths therethrough and provided with more or less conventional mating electrical contact means for this purpose which shall have a further function in that it includes a switch means so constructed and arranged as to connect into the circuit portion remaining with the aircraft after the dropping of the tank, an electrical component having the desired fixed impedance value.

From another and possibly broader point of view, the present invention comprises the provision of an electrical connector usable in the type application above described and also usable in other relationships, in which there is a switch means arranged to be automatically thrown from one position to another upon the separation of the parts or devices, as they are called herein, of the electrical connector.

Specifically summarizing the present invention, the electrical connector according to this invention comprises a longitudinally movable switch member, which is urged, for example, by a suitable spring, to a forward position when the parts or devices making up the connector are separated from one another, which condition would exist following the dropping of a tank aforesaid. In these circumstances the electrical conductor or conductors which are connected to the remaining device or part of the electrical connector are automatically connected through the switch member to a further point, for example, through to each other through an electrical component. The arrangement is further preferably such that the switch member will be moved from its forward to its rear position by the physical act of connecting together the two parts or devices making up the connector; and at this rear position, the connection through the switch member between the circuits or to some additional point or points is open or disconnected.

From a further and specific point of view, the present invention contemplates the provision of an electrical connector generally as aforesaid, in which the parts or devices, whether or not they contain a switch member as aforesaid, shall be retained together against inadvertent separation by resilient means and particularly by a detent which is movable to a position to lock the two devices together in an operative position of the parts, but which may be moved radially out of the way by a sufficient force tending to separate the parts or devices from each other, specifically by relative movement between a body and a supporting portion which jointly make up one of the two parts or devices of the connector. This arrangement is preferably such that the body and the supporting portion having an intermediate so-called "locked" position, but may be moved relatively to one another in one direction to the other, and preferably both directions, incident to the coupling or uncoupling of the parts or devices making up the connector, preferably against spring tension in either direction.

Further objects of the present invention and details of the manner of attaining the several objects hereinabove outlined and specific features of construction will be explained hereinafter in connection with a detailed description of a preferred form of the present invention, which is illustrated in the accompanying drawings in which:

Fig. 1 is a view in elevation of the principal parts of the connector, portions of the means to which the several parts or devices thereof are attached being shown in section;

Fig. 2 is a longitudinal sectional view of the connector of Fig. 1 taken on the line 2—2 thereof and with the parts or devices of the connector in their coupled position;

Fig. 3 is an end view of one of the parts or devices of which the connector is made up as seen from the right of Fig. 5;

Fig. 4 is a view similar to Fig. 3, but showing the other connector device in end elevation as seen from the left in Fig. 6;

Fig. 5 is a view in longitudinal section taken along the line 5—5 of Fig. 3 and showing one of the parts or devices making up the connector;

Fig. 6 is a similar view in longitudinal section taken on the line 6—6 of Fig. 4 showing the other of the devices making up the connector, Figs. 5 and 6 being collectively arranged in the relative positions of these parts or devices of the connector ready to be coupled or immediately after they have been uncoupled as the case may be and contrasting with the showing in Fig. 2 in which these parts are shown coupled together; and Fig. 7 is a wiring diagram of an electrical network or system for measuring and indicating the amount of fuel in a tank, wherein the fuel is measured by a capacitor in the tank and wherein provision is made for separating the tank from the remainder of the system and for substituting a fixed capacitor for the tank capacitor in accordance with the present invention.

Turning first to Fig. 7 of the accompanying drawings, there is illustrated in this figure a system for indicating the quantity of liquid in a tank of a type which has been known for some time. This system includes a measuring capacitor 10, which is shown as one example of an impedance, the impedance value of which varies with the amount of liquid in a tank to be measured. In this instance the liquid to be measured is permitted to flow freely to and from the space between the plates of the capacitor 10; and the capacitor extends more or less vertically through the liquid, so that its capacitance has a value which is a function of the amount of liquid in a tank. The capacitor 10 is connected by conductors 11 and 12 to contact terminals 13 and 14 respectively. These contact terminals are arranged normally to engage and make electrical contact with contact terminals 15 and 16 respectively, but may be separated therefrom when the tank is dropped as indicated by a broken line 17.

While the measuring impedance is here shown as a capacitor 10, it could as well be some other form of impedance, provided, however, that the impedance value is suitably arranged to be a function of the amount of liquid in the tank to be measured.

In the present instance the impedance element or capacitor 10 in this case is connected into an electrical circuit system for translating the impedance value as sensed by the capacitor 10 into a measure of the amount of liquid in the tank, which measure can be indicated by a suitable indicator, here shown generally at 18 and designated by the legend "IND." There is illustrated in Fig. 7 a simple electrical system for this purpose, this system being energized from a suitable source of alternating current, comprising power leads 19 and 20, which are suitably connected to a source of A.C. potential such as may be available in the aircraft in question. The leads 19 and 20 are connected to a primary winding 21 of a transformer 22, the secondary winding 23 of which serves to provide desired sources of potential for a self-balancing bridge circuit. As shown, a center portion of the secondary winding 23 is grounded at 24. The upper end portion of the winding 23, as shown, is connected by a conductor 25 to the terminal 15 and thence to one plate of the capacitor 10. The other plate of the capacitor 10 is connected through a conductor 12, terminals 14 and 16 and a conductor 26 to a circuit output point 27.

A portion of the secondary winding 23 is also connected across a series-connected potentiometer resistance 28 and a variable resistance 29. A variable tap 30 working on the potentiometer resistance 28 is connected through a balancing condenser 31 to the circuit output point 27. The other circuit output point is grounded as shown at 24, so that the two circuit output points 24 and 27 may be used as the input connections for an amplifier 32 of any conventional type, which is arranged to control the operation of a reversible servo motor 33, this motor preferably being of a split-phase type and having one coil energized from the amplifier 32 and a second coil energized through leads 34 and 35 extending from power leads 20 and 19 respectively and in one of which is interposed a phase-changing capacitor 36. Such servo motors are now in common use in systems of this kind and are actuated by an output current from the controlling amplifier, here shown at 32 in a direction in accordance with the phase of that output current. The motor 33 is connected through a mechanical train indicated by a broken line 37 to the potentiometer tap 30, so as to move this tap to a position at which the bridge is balanced, resulting in a null or zero output current from the bridge at the circuit output points 24 and 27. It will be understood that the motor 33 is operated in such a direction and to such an extent as to rebalance the bridge to a condition in which there is a zero or negligible output, so that the motor 33 will be brought to a stop when this condition is reached. The motor 33 is also mechanically connected by a mechanical train indicated by a broken line 38 to the indicator 18 and serves to move the indicator to a position which is proportioned to the position of the potentiometer tap 30 when the circuit is balanced. In such a system the variable resistance 29 is provided for calibration purposes.

If the system were arranged merely as described in detail thus far, the pointer of the indicator 18 would tend to rotate in a direction from a positive reading toward its zero or empty point upon the dropping of the capacitor 10 with the associated tank. What is desired in accordance with the present invention is that there be a fixed capacitor connected into the circuit in the place of the capacitor 10 immediately upon the electrical separation of the capacitor 10 incident to the dropping of the tank. For this purpose there is shown in Fig. 7 a fixed capacitor 39 which is provided with contacts 40 and 41 arranged respectively to engage contacts 42 and 43 upon the dropping of the tank. The separation of contacts 40—41 from contacts 42—43 is shown by a broken line 44, although it will be understood that the parts are constructed and arranged so that immediately upon breaking the electrical connection between the contacts 13—14 and 15—16 respectively on the one hand, contacts 40—41 will be brought into engagement with contacts 42—43. This is effected by what is equivalent to a double-pole, double-throw switch.

Turning now to the electrical connector as such, which is used to effect an electrical interconnection between the contacts 15—16 with contacts 13—14 and referring to the remaining figures of the drawing, i.e. Figs. 1–6 inclusive, it will be seen that the conductors are given substantially the same numbers as in the circuit diagram of Fig. 7. As shown generally in Fig. 1, the connector considered as a whole comprises a first connector device indicated generally at 45, and a second connector device indicated generally at 46, these devices being adapted to be telescopically associated with one another as is seen by a comparison of Figs. 5 and 6, in which the two devices shown respectively are separated, and Fig. 2 in which they are shown in their connected or telescoped position, which is their operative position during the normal use of the apparatus and prior to the time that an associated tank is dropped from the aircraft.

As shown, the device 45 may be suitably carried by a support 47 which may, for example, be a part of the tank to be dropped. This device 45 may comprise an outer substantially cylindrical shell 48 having a flange 49 adapted to be secured to the tank or other support 47 by a plurality of securing means 50 such as rivets or the like. The conductors 11 and 12 may be contained within a suitable cable 51 which is conducted into the interior of the shell 48 and which is provided, for example, with a threaded and flanged fitting 52 secured thereon as shown in the drawings. The fitting 52 may seat against a washer or collet 53, which in turn is seated against an annular shoulder 54 formed inside the shell 48. The fitting 52 may be confined in its position as shown by an annular nut 55 which is threaded into the outer end of the shell 48 as shown and engages a flange portion of the fitting 52 to force it against the washer 53. The nut 55 is preferably provided with a plurality of apertures 56 which may be engaged by a suitable tool for rotating the nut 55 as will be obvious to those skilled in the art.

In the forward end portion of the device 45 there is located a block of insulating material 57 as a suitably formed piece of organic plastic material which is located in its position as shown by providing an enlarged portion 58 thereof adapted to seat against an inturned annular flange portion 59 at the forward end of the shell 48 as shown. This member or block 57 is confined in position by a rear member 60 which may be of metal or of insulating material as desired and which is bored to receive a pair (in this instance) of insulated connector assemblies. Each of these assemblies comprises an annular sleeve 61 of metal or the like and an internal annular sleeve or collet 62 of insulating material. Positioned within each sleeve of insulating material 62 is a connector pin 63 which is suitably provided with a rear perforated or flattened portion (at the left as seen in Figs. 2 and 5) for connection to the conductors 11 and 12 respectively, and which is provided with a forward portion engaging and making electrical contact with a connector sleeve 64. Two of these assemblies and connectors are provided as shown; although any desired number could be used in accordance with the number of conductors or circuit connections to be transmitted through the electrical connector as a whole. The forward ends (at the right as seen in the drawings) of the sleeve 64 are slotted in the usual manner so as to permit them tightly to grip complementary connector members shown as pins 65 carried by the device 46 and later to be described. Thus, the connector sleeves 64 form in effect the connector portions 13 and 14 of Fig. 7. It will be understood that the sleeves 64 are located and positioned respectively in suitable longitudinal bores in the block 57.

Referring now to Fig. 2 at the center and right and to Figs. 4 and 6, the second connector device 46 is shown adapted to engage the first connector device 45 which has been described. This second device 46, from a broad point of view, is provided with mating electrical contacts for completing electrical circuits through the connector as a whole when the two devices 45 and 46 are coupled together in their operative position as shown in Fig. 2.

Turning first to the mechanical arrangements of the device 46 and its mechanical means for securing it to the complementary device 45 against inadvertent dislocation of these two devices, the device 46 comprises a supporting member generally indicated at 66 having an outwardly extending flange 67 arranged to be secured, for example, by screws 68 to a support 69 which may be a part of the aircraft with which the connector as a whole is associated. Thus, the supporting member 66 is rigidly secured in a predetermined position.

Axially slidable within the supporting member 66 is a body member at 70 having an outstanding annular flange portion 71 formed as a rib thereon and arranged in sliding relation in a substantially cylindrical bore 72 within the supporting member 66. The bore 72 terminates at its left as shown in the drawings, i.e. at its forward end as it is hereinafter referred to in a shoulder 73. Positioned between the shoulder 73 and the annular flange 71 is a helical compression spring 74 and positioned on the other side of the flange 71 and within the cylindrical bore 72 is a second compression spring 75, which is confined in position and by an abutment at its rear end (at the right as seen in Fig. 6). This abutment may be provided by spinning inwardly in an annular portion of the member 66 as shown at 76. Thus the body member 70 is resiliently located within the supporting member 66, while permitting some resilient movement thereof in both directions from its mean or intermediate position against the compression of the springs 74 or 75.

The body member 70 is further provided with a plurality of detent means, each shown as a ball 77 positioned in an aperture in the annular shell making up the forward end portion of the body member 70, the balls 77 being prevented from bodily movement inwardly of this shell by being located in tapered apertures, the tapering being toward the inside and the smaller diameters of these apertures being slightly less than the diameters of the ball 77. Thus these balls 77 are not permitted to move inwardly away from the body member 70 and wholly out of the apertures, but may move to a limited extent radially outwardly. At the normal or mean position of the member 70 with respect to the supporting member 66, the balls 77 are opposite and have ridden up upon a cam rib 78 formed inside and preferably integral with the member 66, which forces the balls respectively to their radially innermost positions.

The operation of the parts thus far described in moving from the position of the devices 45 and 46 shown in Figs. 5 and 6 respectively to their operative or engaged position shown in Fig. 2 is accomplished as follows: upon the initial entry of the shell 48 into the forward or left hand end as seen in the drawing of the shell portion of the body member 70, it will be found that the diameter of the shell portion 48 is just slightly less than the inside diameter of the shell portion 79 at the forward end and the body member 70. Thus these members may be freely telescoped together. However, the balls 77 extend radially inwardly to such an extent as to be engaged by the end of the shell 48 and particularly by a beveled edge portion thereof shown at 80. This tends to move the balls outwardly as well as to move the balls and the body member 70 to the rear (to the right as seen in Fig. 6) with respect to the supporting member 66. The balls 77 are prevented from radial outward movement by the cam rib 78 in the position of the parts shown, so that the body member 70 is forced to the right as seen in Fig. 6, compressing the spring 75, until the balls 77 have ridden off the cam rib 78. At this time, the balls may be forced outwardly by the beveled portion 80, permitting the further entry of the shell 48 into the cylindrical shell portion 79 and until the devices 45 and 46 are substantially in the position shown in Fig. 2. As the parts approach this position, the inner end portion of the shell 48 is guided by an O-ring 81, which tightly engages the outside of the shell 48 and prevents ingress of moisture to the electrical contacts later to be described. This O-ring 81 is contained in a suitable annular groove as shown within the rib 71. When the shell 48 has moved completely to its innermost position, i.e. to the position of the parts shown in Fig. 2, it comes up against an abutment, which may be formed as a split resilient ring 82 seated in an annular groove 83 formed on the inside of the body member 70 as shown. Also, when the parts have reached this position, a plurality of depressions, or an annular groove as the case may be, shown at 84 and formed in the outside of the shell 48, come into alignment with the normal position of the balls 77 or at least reach the position where the balls 77 may move radially inwardly into these depressions or into this annular groove (according to which is used). At this time, the balls 77 are no longer required to be in their rear or outermost positions and no further force is available effective to keep the spring 75 under compression, so that this spring forces the body member 70 back to its intermediate or mean position and causes the balls 77 to ride up upon the high portion of the cam rib 78 and move into the depressions or annular groove 84 in the position of the parts shown in Fig. 2.

Starting with the parts in the position of Fig. 2, the disconnection of the devices 45 and 46 is effected by a straight pull against resilient force. At the start it will be noticed that the balls 77 are seated in the recesses or the groove 84, positively preventing relative axial movement of the shell 48 away from the body member 46. It is necessary, therefore, that these two members shall move as a unit to the left as seen in Fig. 2 against the compression of the spring 74 until the balls 77 ride off the high portion of the cam rib 78. At this time the balls 77 can be forced outwardly by the curved face of the recesses or the groove 84, so as to permit the separation of the devices 45 and 46. This relative movement apart of these two devices, continues until the beveled edge 80 has cleared the balls 77, at which time there is nothing further to keep the balls 77 from moving radially inwardly, which occurs under the joint action of the inclined sides of the cam rib 78 and under the influence of the force exerted by the spring 74 in returning the member 70 to its normal or mean position with respect to the support 66.

The only point requiring further explanation as to the mechanical interengagement of the devices 45 and 46 is that there are means preventing such interengagement except at a particular oriented position, so that the electrical contacts will be in proper alignment with each other. For this purpose a simple key and slot means may be provided including a lug 85 extending laterally from the device 45 as seen best in Fig. 3 and arranged to seat in a longitudinal slot 86 formed in the side wall of the body member 70 in that portion thereof into which the forward portion of the device 46 is adapted to telescope. Any other equivalent means for this purpose is to be considered within the purview of this invention.

The rear end portion of the body member 70, to the right as seen in Figs. 2 and 6, is provided with a movable switch member generally indicated at 87. As shown, the inside of this rear portion of the body member 70 is preferably made cylindrical to receive a substantially cylindrical plunger member 88 formed as a piston in a cylinder and urged to the left as shown in the drawings (i.e. forwardly of the device 46) by a compression spring 89 extending between the member 88 and the inturned rear end portion of the cylindrical portion of the body member 70 as shown at 90. The member 88 may be of suitable metal or of other material and is provided with an annular groove for receiving a suitable O-ring 91 of any appropriate material. Movement of the switch member 87, including the metallic member 88 thereof, to the left as seen in Figs. 2 and 6 beyond the position shown in Fig. 6 is prevented by engagement of a portion of this member with the split ring 82. This switch member therefore is movable between a left hand position shown in Fig. 6 and a right hand position shown in Fig. 2, the movement (to the right) being effected by engagement between the block 57 forming a part of the device 45 and the left hand end of the switch member 87, incident to movement together of the devices 45 and 46, and this movement being such as to compress the spring 89. The switch member 87 is moved to the left upon the separation of the devices 45 and 46 under the influence of the spring 89 and until a portion of the plunger member 88 engages the abutment provided by the split ring 82.

Mounted in the switch member 87 and particularly in the plunger member 88 thereof are the electrical contacts 65 previously referred to. The mounting as to each contact comprises an assembly including a sleeve 91a which may be of metal and formed as a hollow cylindrical member, these sleeves 91a being suitably held by friction or otherwise in the member 88. Within each member 91a is an annular insulator 92 in which the pins or electrical contacts 65 are respectively mounted. It will be understood that there are as many such separate electrical contacts carried by the member 87 as there are electrical circuit connections or paths through the entire device, two being shown in the present instance.

Also mounted in the member 88 and in axial alignment with the pins 65 are a pair of insulator members 93, which are securably attached in a manner not illustrated in appropriate recesses in the member 88. The insulator members 93 are generally annular and within each such member is a hollow contactor element 94 formed in substantially the same way as the connector sleeves 64 previously described and arranged respectively to surround and make permanent contact with the rear ends of pins 65. The rear ends of these elements 94 are also formed split for making further electrical contacts respectively as will be seen by a comparison of Figs. 6 and 2.

Carried by the insulator members 93 at a point in each instance spaced to the right as shown in the drawings, of the right hand ends of the elements 94 are electrically conductive sleeve members 95 and 96 which are similar to one another, but are given different reference characters for a reason which will appear hereinafter.

In the present instance conductors corresponding functionally to contact terminals 15 and 16 are shown connected to the rear end (at the right as seen in Figs. 2 and 6) of the body member 70 through an additional housing member 97 which is secured to the right hand end of the body member 70 in a manner not particularly illustrated. The introduction of the conductors corresponding to contact terminals 15 and 16 to the housing 97 may be in any suitable way not illustrated in detail and forming per se no part of the present invention, but possibly including connector means 98 to provide for the use of coaxial cables in this embodiment of the invention. In any event, these conductors are led through suitable supporting means, each including an annular metal collar 99 and a contained annular insulator 100 and carried by the right hand end, as seen in the drawings, of the body member 70, these conductors extending to the left from the right hand end of the body member 70 in the form of metallic pins or studs 101. The rear portions (at the right, Figs. 2 and 6) of these pins or studs 101 is covered with suitable insulating material 102; while the forward ends thereof (at the left, Figs. 2 and 6) are enclosed in electrically conductive sleeves or coverings 103. The arrangement is such that the sleeves 95 and 96, which are of conductive material, slide upon the outside of the sleeves or coverings 103 and 102, which preferably have the same external diameter and in which this external diameter is substantially equal to the internal diameter of the contact sleeves 95 and 96. Thus, at the position of the switch member 87 shown in Fig. 6, the sleeves 95 and 96 will be in engagement with the conductive coatings or sleeves 103 and thus in contact with the conductors corresponding to terminals 15 and 16. This will enable the sleeves 95 and 96 to be connected to any suitable place or places, for example, to one or more electrical components which are desired to be connected to the contact terminals 15 and 16 at this position of the switch member 87.

On the other hand, when the switch member 87 is moved to its right hand position shown in the drawings in Fig. 2 or its rear position, the sleeve members 95 and 96 will have been moved onto the insulating coatings 102 and hence will be out of electrical contact with the terminals or conductors 15 and 16. At this time the conductive sleeves 103 will be received within the conductor elements 94, so as to make electrical contact through to the pins 65. These pins in turn will be received within the connector sleeves 64, so as to make contact through the pins 63 and in turn through to the conductors 11 and 12. There is thus provided in accordance with the present invention what is in effect a double-pole, double-throw switch operated in response to the principal devices 45 and 46 of the connector engaging and disengaging one another.

When the connector of Figs. 1–6 is used in the circuit of Fig. 7, it is desired to connect a capacitor as 39 into the circuit at the time the principal tank capacitor 10 is disconnected therefrom. This disconnection of the capacitor 10 as will now be obvious, is effected by withdrawing the device 45 from the device 46. At this time and under the action of the spring 89, the switch member 87 moves to the left as seen in Fig. 6, causing the sleeve members 95 and 96 to come into engagement with the conductive sleeves 103. As seen in Fig. 7, the conductive sleeves 103 in this instance may be represented by the contacts 42 and 43; while the sleeves 95 and 96 may be represented in the diagram of Fig. 7 by the contactors 40 and 41. For the purposes of the circuit of Fig. 7, the contacts 40 and 41 are shown connected to the two terminals of a fixed capacitor 39. The same result may be effected in the physical device of the remaining figures by the provision of a fixed capacitor 39 connected as shown to a portion of the sleeve members 95 and 96 and physically carried by the switch member 87 so as to move therewith. No particular means are shown for physically mounting the capacitor 39 on the switch member 87; but it will be understood that any such means suitable for this purpose may be provided in a manner not illustrated, but which will be obvious to those skilled in the art. The result of this is to carry out in the devices of Figs. 1–6 the electrical connection and disconnection described with respect to Fig. 7.

While there has been illustrated and described but one principal form of the present invention and of the various phases thereof, various modifications and other variations will occur to those skilled in the art from the foregoing. I do not wish to be limited, therefore, except by the scope of the appended claims, which are to be construed validly as broadly as the state of the prior art permits.

What is claimed is:

1. An electrical connector, comprising a first connector device, a second connector device adapted to be telescopically engaged with said first connector device, said device having mating electrical contacts for completing an electric circuit through said connector when said devices are coupled together in an operative position thereof and one of said devices having a conductor connected to its electrical contact aforesaid having a portion at least which extends longitudinally of said one device, a switch element movable longitudinally in said one device between a forward position nearer to the other of said connector devices when said devices are coupled together and a rear position, means for resiliently urging said switch element toward its forward position, said longitudinally extending portion of said conductor aforesaid having a rear portion covered by insulating material and a forward electrically conductive portion open to the outside thereof, contact means on said switch element for engaging the outside of said longitudinally extending portion of said conductor so as to be electrically in contact therewith when said switch element is at its forward position and the contact means thereof is in engagement with the electrically conductive forward portion of said conductor and to be insulated from said conductor at the rear position of said switch element by said insulating material covering a portion of said conductor, and means for moving said switch element from its forward to its rear position in response to the coupling together of said first and said second connector devices.

2. An electrical conductor in accordance with claim 1, in which said connector devices have mating electrical contacts for completing two separate electric circuits through said connector when said devices are coupled together in an operative position thereof, in which said one of said devices has a pair of conductors connected to its electrical contacts aforesaid respectively and each having a portion at least which extends longitudinally of said one device, in which both longitudinally extending portions of said conductor aforesaid have rear portions covered by insulating material and forward electrically conductive portions open to the outside thereof, and in which said switch element carries a pair of similar contact means for engaging the outsides of the longitudinally extending portions of both said conductors, so as to provide a double pole-type switch effective to make electrical contact with the longitudinally extending portions of said conductors only when said switch element is at its forward position.

3. An electrical connector in accordance with claim 1, in which said switch element also carries a portion of a conductor which is in electrical contact with the electrically conductive forward portion of the longitudinally extending portion of said conductor in said one device at the rear position of said switch element and serves at this position as a part of the electric circuit through said connector when said devices are coupled together.

4. An electrical connector in accordance with claim 2, in which said contact means carried by said switch element are connected respectively to the two terminals of a fixed capacitor, whereby said connector may be used to interconnect a measuring capacitor in a fuel tank which is adapted to be dropped from an aircraft with a capacitance responsive electrical network in said aircraft for measuring and indicating the fuel in the tank as a function of the capacitance of said measuring capacitor, said connector being effective upon the dropping of the tank to interconnect said fixed capacitor into the said network in the place of said measuring capacitor.

5. An electrical connector, comprising a first connector device, a second connector device adapted to be telescopically engaged with said first connector device, said devices having mating contacts for completing a pair of parallel electric circuits through said connector when said devices are coupled together in an operative position thereof, conductors having longitudinally extending portions and located in one of said devices, a longitudinally slidable switch element located in said one device and having a portion slidable on the longitudinally extending portions of said conductors, a spring tending to move said slidable switch element from a rear position toward a forward position which is nearer to the direction from which the other of said devices is moved to couple with said one device, contact means carried by said switch element and slidable on the outside of the longitudinally extending portions of said conductors, insulating means covering the rear parts of the longitudinally extending portions of said conductors and serving to separate said contact means carried by said switch element from said conductors at the rear position of said switch element, electrically conductive portions at the forward end portions of the longitudinally extending parts of said conductors and arranged to be engaged by said contact means carried by said switch elements at the forward position thereof, said contact means carried by said switch elements being connectable to an electrical component for connecting said component to said conductors at the forward position of said switch elements; a pair of longitudinally extending conductor portions carried by said switch element and engageable with the conductive forward end portions of the first named conductors at the rear position of said switch element and having other parts engageable with the mating electrical contacts of the other connector device when said devices are coupled together, and means for retaining said devices in their coupled position against inadvertent movement apart; said other of said devices being effective upon the coupling of said devices together to move said switch element against the action of the spring aforesaid from its forward to its rear position.

References Cited in the file of this patent

UNITED STATES PATENTS

| | | |
|---|---|---|
| 2,640,118 | Werner | May 26, 1953 |
| 2,735,993 | Humphrey | Feb. 21, 1956 |
| 2,846,880 | Wickesser | Aug. 12, 1958 |
| 2,911,829 | Weiss et al. | Nov. 10, 1959 |

FOREIGN PATENTS

| | | |
|---|---|---|
| 693,089 | Great Britain | June 24, 1953 |